(12) United States Patent
Maclin et al.

(10) Patent No.: US 6,584,471 B1
(45) Date of Patent: Jun. 24, 2003

(54) SYSTEM AND METHOD FOR THE ADAPTIVE, HIERARCHICAL RECEIPT, RANKING, ORGANIZATION AND DISPLAY OF INFORMATION BASED UPON DEMOCRATIC CRITERIA AND RESULTANT DYNAMIC PROFILING

(76) Inventors: Leon Maclin, 40-1808 Newport Pkwy., Jersey City, NJ (US) 07310; Alexander Greyserman, 15 Wildwood Dr., Short Hills, NJ (US) 07078

( * ) Notice: Subject to any disclaimer, the term of this patent is extended or adjusted under 35 U.S.C. 154(b) by 0 days.

(21) Appl. No.: 09/504,328

(22) Filed: Feb. 14, 2000

(51) Int. Cl.[7] ............................. G06F 7/00; G06F 17/00
(52) U.S. Cl. ...................... 707/104.1; 707/102; 707/5
(58) Field of Search ................... 707/1–10, 100–104.1, 707/200–206; 345/968

(56) References Cited

U.S. PATENT DOCUMENTS

| | | | | |
|---|---|---|---|---|
| 5,692,129 A | * | 11/1997 | Sonderegger et al. | 707/10 |
| 5,859,978 A | * | 1/1999 | Sonderegger et al. | 707/10 |
| 5,867,799 A | * | 2/1999 | Lang et al. | 707/1 |
| 5,901,287 A | * | 5/1999 | Bull et al. | 709/218 |
| 5,931,907 A | * | 8/1999 | Davies et al. | 709/218 |
| 5,940,821 A | * | 8/1999 | Wical | 707/3 |
| 5,953,718 A | * | 9/1999 | Wical | 707/1 |
| 5,966,695 A | * | 10/1999 | Melchione et al. | 705/10 |
| 6,029,165 A | * | 2/2000 | Gable | 707/1 |
| 6,029,195 A | * | 2/2000 | Herz | 725/116 |
| 6,072,493 A | * | 6/2000 | Driskell et al. | 345/804 |
| 6,108,645 A | * | 8/2000 | Eichstaedt et al. | 707/1 |
| 6,128,624 A | * | 10/2000 | Papperniak et al. | 705/10 |
| 6,195,651 B1 | * | 2/2001 | Handel et al. | 707/2 |
| 6,199,099 B1 | * | 3/2001 | Gershman et al. | 345/966 |
| 6,236,977 B1 | * | 5/2001 | Verba et al. | 705/10 |
| 6,314,420 B1 | * | 11/2001 | Lang et al. | 707/10 |
| 6,480,885 B1 | * | 11/2001 | Olivier | 709/207 |
| 6,493,702 B1 | * | 12/2002 | Adar et al. | 707/3 |

* cited by examiner

*Primary Examiner*—Greta Robinson
*Assistant Examiner*—Linh Black
(74) *Attorney, Agent, or Firm*—Mitchell A. Stein; Stein Law, P.C.

(57) ABSTRACT

A system and method for receiving, organizing and displaying information received from a plurality of users, having a hierarchical database with at least one expandable level, at least one of the at least one expandable levels having at least two expandable sublevels; an interactive interface for placing each user at a level and sublevel in the database, receiving. user-supplied information for modification and addition to the content and structure of the levels and sublevels of the database, receiving user-supplied commands for navigating through and extracting content from the database, presenting content from the database in accordance with the information and commands supplied; a counting routine which increments a level and sublevel specific counter each time a user is placed at a level and sublevel within the at least two expandable levels and sublevels; and a database sorting function for gathering the plurality of user-supplied information and commands virtually simultaneously, and updating the hierarchical structure of the database in accordance with the magnitude of the number of the specific counter. The database levels and sublevels are categories, subcategories and query items. The commands are search, add, select and interact. Additionally shown is a data base search engine for receiving database search commands from at least one user, searching the database for matches, and presenting the results of the search. The system dynamically profiles members of an on-line community in that it allows a member to see those who have answered query items in a subcategory and category in a manner suggestive of some desired similarity in character.

7 Claims, 12 Drawing Sheets

SYSTEM AND METHOD FOR THE ADAPTIVE, HIERARCHICAL RECEIPT, RANKING, ORGANIZATION AND DISPLAY OF INFORMATION BASED UPON DEMOCRATIC CRITERIA AND RESULTANT DYNAMIC PROFILING

FIELD OF THE INVENTION

The present invention relates to the field of information receipt, organization, presentation, and retrieval, and more particularly to an information database and system that sorts and re-sorts information in virtual real time based upon democratic criteria, allowing members to provide information, designate and weight the designations of that information, while the system tracks and modifies the display of that information in accordance with the weighted sums of such designations. The invention further relates to automatic, dynamic profiling of members in a manner suggestive of profile similarities and intellectual matching among them.

BACKGROUND OF THE INVENTION

The Internet is filled with information in a generally disorganized and flat format. Information presentation is based either upon the principals of anarchy, i.e., the "absence of government," or autocracy, i.e., "unchecked by constitutional restrictions or limitations." See *Black's Law Dictionary*, 4th Edition, 1968.

For example, entities can allow their information to be accessible, but organization is dictated predominantly by location, such as by way of a Uniform Resource Locator or "URL." This is an example of content anarchy, in which all content is equally weighted and anything can be presented in virtually any format. All such presentations remain at the same level, with no hierarchical structure between them. In general, there are no specialized rules for organization of information across multiple URL's that are owned by independent entities. Any individual entity can present anything at any time, in virtually any format.

Each URL tags to a specific server or group of servers, with its own predefined organizational structure. Within the constraints of a particular location in which users can access and exchange information, lie a precept- of rules that the particular location imposes in advance of the exchange. For example, if one "dials in" to a chat room, the subject and rights of access and disclosure are already predefined. One can establish a new chat room, but there is limited ability to poll the general audience and objectively determine commonality for the purposes of establishing the proper subject. Accordingly, such systems are content autocratic.

More specifically, the subject, format and ultimately the very existence of a given site is determined either by its owner, originator or editorial administrators. The same people determine site structure, administer the site and make all the important decisions concerning the operation of the site. While such decisions may comport with popular opinion, this outcome is not by design but by mere happenstance.

A traditional example of an autocratic environment is a bulletin board. The particular categories and subcategories are predetermined by the creators or administrators of the site, and the individuals who log on can subjectively provide content which is presented in flat form. Under the original bulletin board concept, there was no mechanism for objectively determining among the users commonality between the postings. The postings were merely placed, and searching by word between them provided. The bulletin board concept has evolved to the extent of permitting the designation of categories by the individual users and threads within categories. Still, however, there is no mechanism for objectively recreating and automatically re-sorting the categories for posting based upon interest. Thus, the bulletin board, in both its original and expanded form, remains a mix of autocratic (i.e., the categories are predefined) and anarchic (i.e., the information is flat in the category) information.

It should be appreciated that in an environment in which anyone can open a category or posting on any topic, may appear, at first blush, to resemble a free, democratic environment. However, the interest that others have in the category is in no manner considered in determining whether to maintain that category. This has many negative consequences. It is common for users to find chat rooms with either no one or a handful of participants, and bulletin board categories with few to no listings, or full of postings unrelated to the board's stated category. Worse yet, many boards are filled with junk content and advertising. Yet these chat rooms and categories remain because the structure of the environment allows them to be created and maintained, even though there is little to no interest in them, and their existence interferes with the meaningful organization and operation of other, more popular boards. Such environments demonstrate true content anarchy.

Allowing the webmaster of the site to edit the contents and thereby remove categories or chat rooms that the webmaster, in his/her view, believes to be unpopular, offensive or irrelevant, or, in the alternative, add categories or rooms that the webmaster believes to have interest and appeal, now imposes the autocratic rule of the webmaster on the system.

It should thus be appreciated that heretofore unknown is a mechanism by which information can be created and maintained in categories that truly reflect the democratic interests of the users. To allow the users to subjectively render determinations would send the site back to the anarchic; to predetermine based-upon editorial decisions would send the site back to the autocratic.

Examples of traditional autocratic and anarchic sites abound. For example, "theglobe.com" is a traditional bulletin board design in which the categories are predetermined, and postings are permitted, even though certain of such postings are infrequently to never viewed, are filled with junk, or are unrelated to their stated purpose. "Ezboards.com" differs from "globe.com" mainly in the ease of its interface and ability to create categories, but otherwise suffers the same disabilities.

"Vote.com", "voter.com" and "speakout.com" poll audience responses to predetermined categories and predetermined questions. These sites, however, do not invoke an automatic and objective, democratic hierarchy. Similarly, while "remarq.com" includes a rating system, in which scores are "assigned," this system is clearly not objective, nor are the categories created and maintained based upon the objective, hierarchical interests of the users.

The Internet thus presently lacks in true abilities to create collaborative information environments, or so-called "content democracies." (The phrase "Content Democracy" is a trademark of the inventors. All use is by permission only)

Likewise, the Internet lacks in the ability to perform objective dynamic profiling. In other words, typical "matchmaking" engines and site profiling procedures require the subjective self-revelation of the participants—they are compelled to answer "pre-canned" questionnaires and describe themselves in the manner they wish to be, rather than in the manner that they actual are. Consequently, if the questions don't elicit a true profile, then the results are useless. Likewise, if the questions are not honestly answered, then the results are misleading. Additionally, by requiring the provision of answers to such questionnaires, a whole category of non-participating users is lost—i.e., those who elect not to answer the questionnaire are simply left unprofiled or are denied access to the site.

It is thus an object of the instant invention to provide an environment in which both categories and subcategories of information are ranked based upon objective indicia rather than subjective determinations of the autocrats (i.e., the founders or editorial boards) or anarchists (i.e., the users who can "throw up" anything they want).

It is a further object of the instant invention to provide a system that automatically and objectively ranks in hierarchy information that is provided in a manner that correlates with the actual interests of the participants of the site.

It is a still further object of the instant invention to provide dynamic profiling of participants by automatically tracking behavior in the site, and then allowing profiling, and hence selection of "matches" based upon such objectively collected and ranked information.

SUMMARY OF THE INVENTION

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

The foregoing objects and other objects of the invention are achieved through a system and method for receiving, organizing and displaying information received from a plurality of users, having a hierarchical database with at least one expandable level, at least one of the at least one expandable levels having at least two expandable sublevels; an interactive interface for placing each user at a level and sublevel in the database, receiving user-supplied information for modification and addition to the content and structure of the levels and sublevels of the database, receiving user-supplied commands for navigating through and extracting content from the database, presenting content from the database in accordance with the information and commands supplied; a counting routine which increments a level and sublevel specific counter each time a user is placed at a level and sublevel within the at least two expandable levels and sublevels; and a database sorting function for gathering the plurality of user-supplied information and commands virtually simultaneously, and updating the hierarchical structure of the database in accordance with the magnitude of the number of the specific counter. The database levels and sublevels are categories, subcategories and query items. The commands are search, add, select and interact. Additionally shown is a data base search engine for receiving database search commands from at least one user, searching the database for matches, and presenting the results of the search. The system dynamically profiles members of an on-line community in that it allows a member to see those who have answered query items in a subcategory and category in a manner suggestive of some desired similarity in character.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements through the several views.

DETAILED DESCRIPTION OF THE PREFERRED EMBODIMENTS

Figure 1:
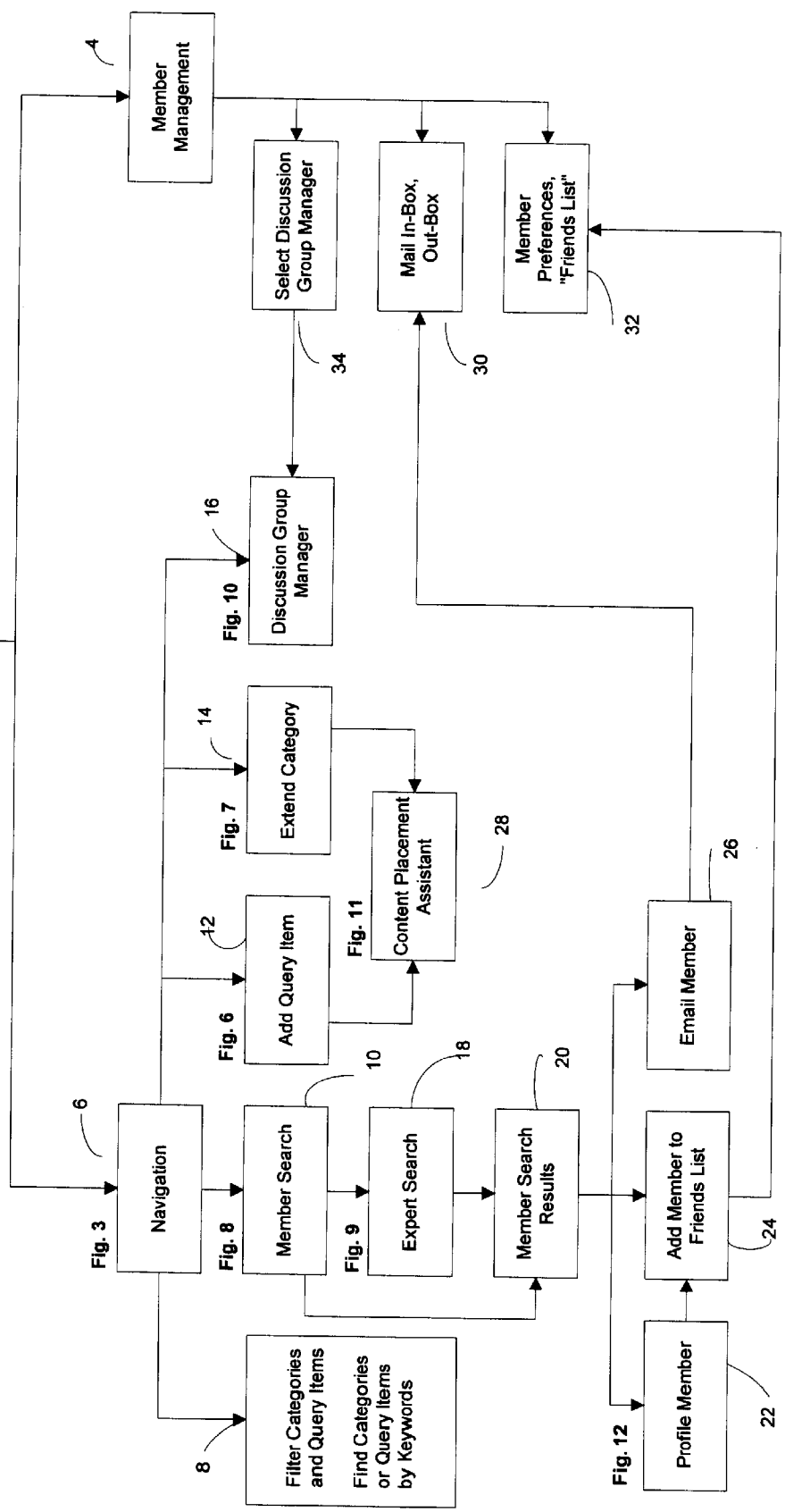
FIG. 1 is diagraimnatical representation of the general system components in accordance with a preferred embodiment of the instant invention.

In accordance with the subject invention, FIG. 1 shows an overview of the components and the method by which the components together comprise the system that provides information in a democratic way. In particular, a member logs in via step 2, and then can manage via step 4 (as described in further detail in connection with FIG. 2 below) his/her incoming and outgoing email and discussion groups (via select discussion group manager 34) associated with various categories and query items in which he/she has taken an interest. Log in via step 2 also permits the member to travel to the navigation screen 6.

As described in greater detail below in connection with FIG. 3, navigation tools are made available by way of navigation screen 6 which allows the member to traverse a hierarchy of categories, subcategories and query items, add content, respond to query items, and search or filter the manner in which the hierarchy is presented.

Navigation screen 6 also permits access to search screen 8, which provides the member with the opportunity to filter categories and query items, and to find categories or query items by selecting key words.

Navigation screen 6 further permits access to member search screen 10 (described in greater detail in connection with FIG. 8, below), add query item screen 12 (described in greater detail in connection with FIG. 6, below), extend category screen 14 (described in greater detail in connection with FIG. 7), and discussion group manager screen 16 (described in greater detail in connection with FIG. 10).

Generally, in member search screen 10, the current member gets to perform an "and" search for other members/users based-upon their responses to query items which were marked or specified in the navigation screen 6 by the current member. The results of that search are displayed at member search results step 20.

Alternatively, members can choose to modify the "and" search to perform a more complex search based upon known boolean logical connectors, via expert search step 18.

Either by way of member search step 10 or expert search step 18, the member is shown the results at screen 20, and then can perform certain additional functions upon viewing those results. For example, the member can select a member from the list of search results, which will then display at step 22 the profile of that selected member. It should be recognized that the profile displayed shows all the query items to which that member has responded, as well as that member's responses. In this manner, the member who is viewing that selected member's profile, can be assisted in determining whether to contact, that member via email member step 26, or add that member to a "friends list" via step 24. The member's email box is controlled at screen 30, and the member preferences and friends list are controlled at screen 32. (One of ordinary skill in the art will, appreciate that the inventors herein have utilized "steps" and "screens" in a somewhat synonymous manner to indicate a step or series of steps or functions that are displayed or accessed by way of a screen in connection with the running of a computer program)

Figure 11:
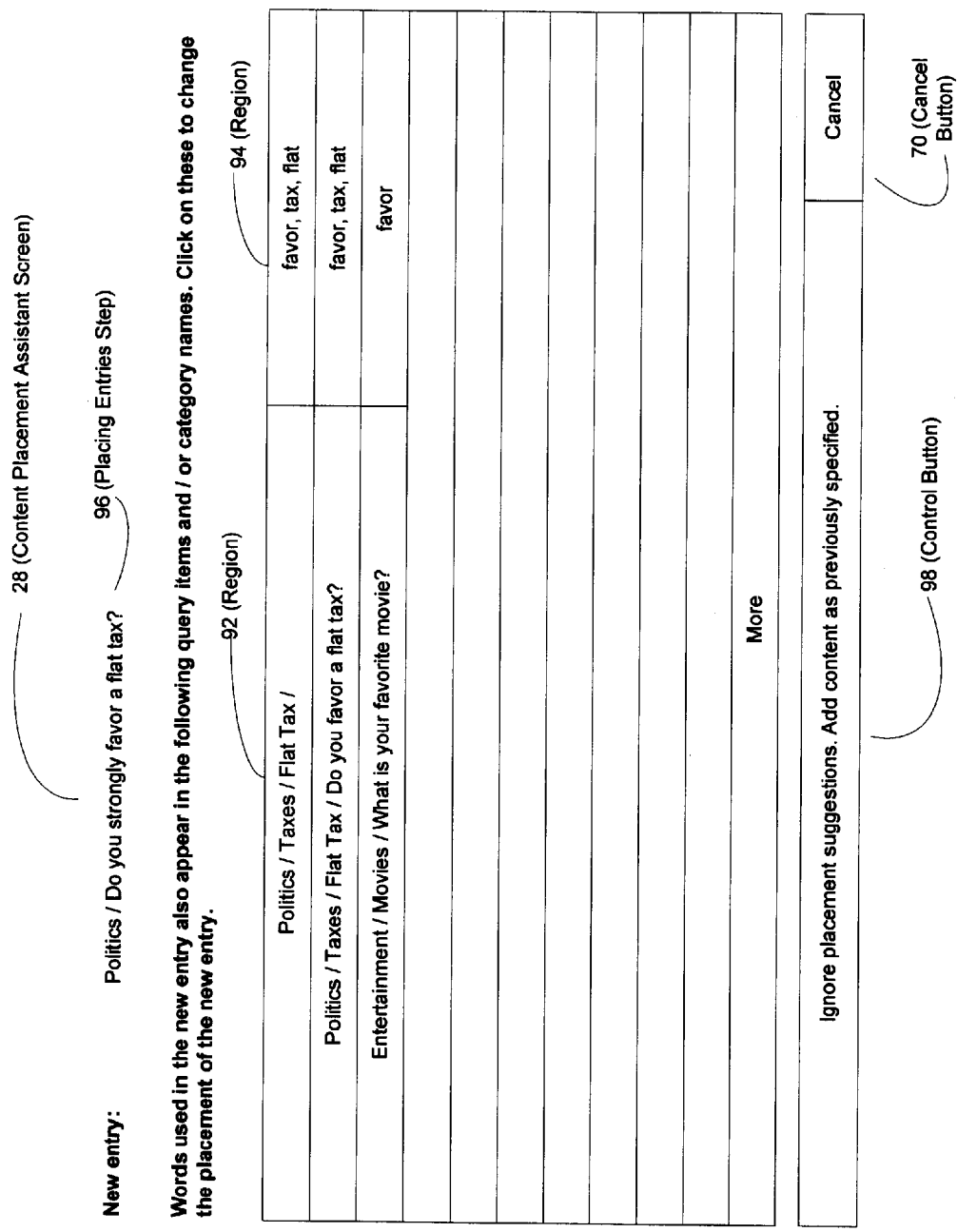
FIG. 11 is a breakout diagram of the functionality of the "content placement assistant" component of the instant invention, shown in FIG. 1.

When the member is in add query item step 12 or extend category step 14, the member can utilize a utility called "content placement assistant" 28 which, as described in greater. detail in connection with FIG. 11, will provide the member with various potential locations for placement of the query item or extended category based upon word search similarities.

Figure 2:
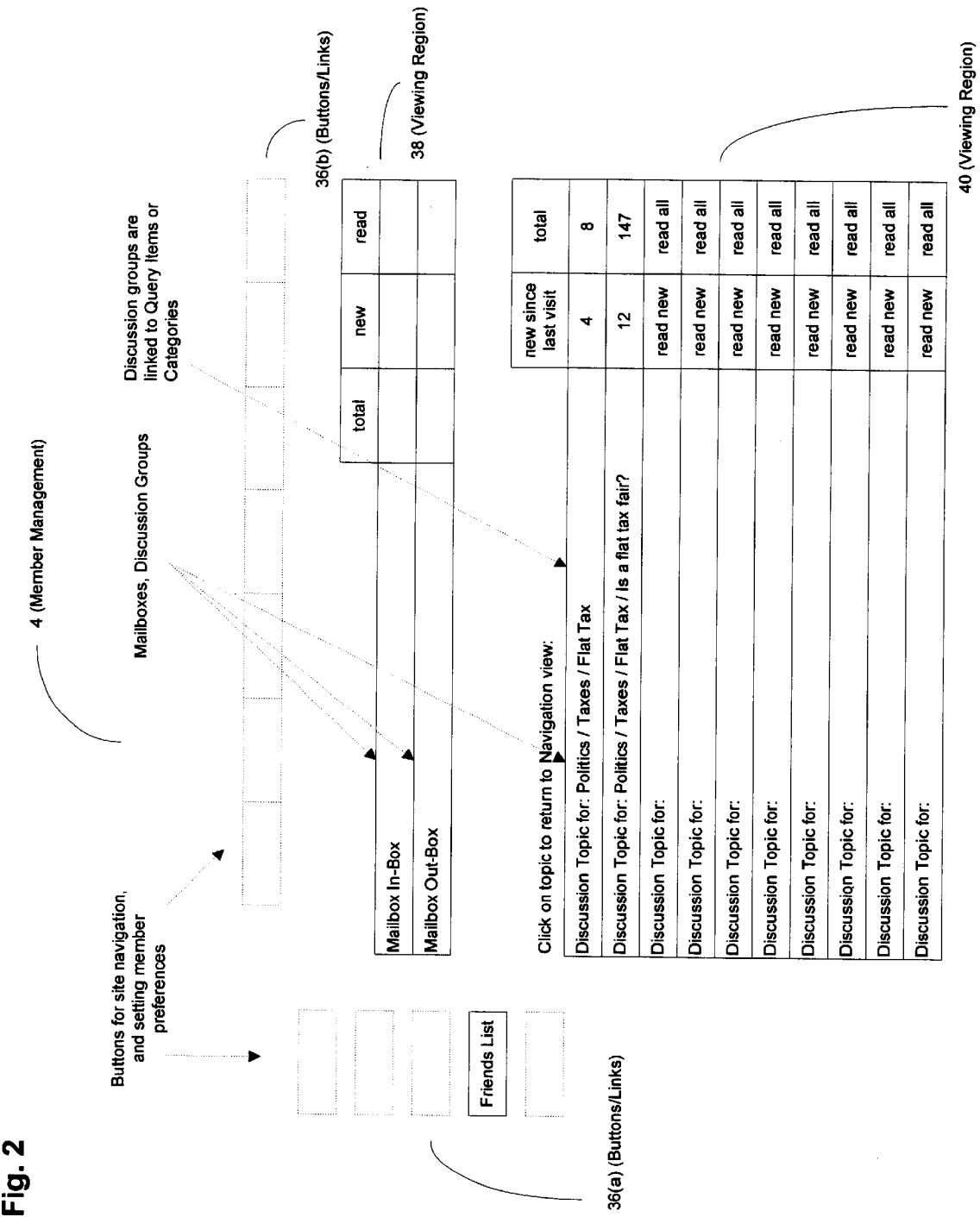
FIG. 2 is a breakout diagram of the functionality of the "member management" component of the instant invention, shown in FIG. 1.

FIG. 2 shows the member management screen 4 in greater detail. In particular, member management screen 4 allows members to manage incoming and outgoing on-site email boxes and discussion groups, set member preferences, access the online "friends list", and access direct links to other areas of the site. In particular, buttons in areas 36(a) and 36(b) are to links that take members directly to other areas of the site—directly to navigation screen 6, for example. Viewing region 38 shows the status of the member's email in- and out- boxes. The total number of incoming emails, the number of emails sent, and the number of read and unread emails is shown for each box. Clicking on the in-box or out-box takes members to the mailbox management screen 30. Viewing region 40 comprises a list of the discussion groups to which the member has subscribed. Here, too, the number of total postings is shown, as well as the number of postings since the member's last visit to the discussion group.

In accordance with the preferred,database design, discussion groups are linked to the category names and query items to which they belong. Clicking on the discussion group title takes members to navigation screen 6 and places them in the part of the hierarchy where the relevant category or query item resides.

Figure 3:
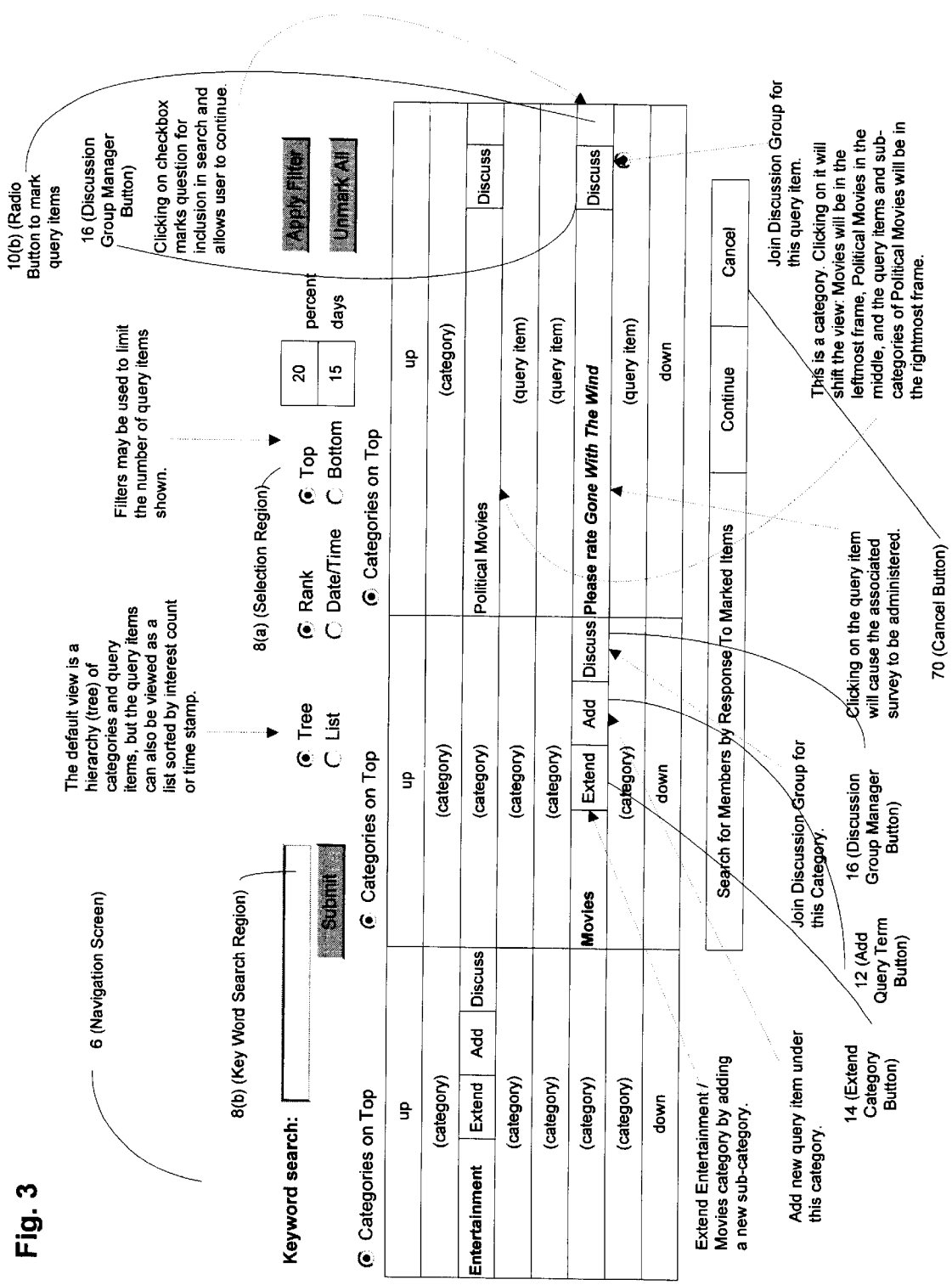
FIG. 3 is a breakout diagram of the functionality of the "navigation" component of the instant invention, shown in FIG. 1.

FIG. 3 shows the detail of navigation screen 6 providing members with the ability to filter and navigate the hierarchy of content (categories and query items), search for content, add content, subscribe to discussion groups, respond to query items, and mark query items for use in searching for other members. In particular, selection region 8(a) provides members with the ability to display content as either a list or hierarchy (tree) ranked by interest count or date and filtered by top or bottom percentile. Region 8(b) provides members with the ability to search for keywords appearing in category names or query item descriptions. Radio button 10(b) allows members to mark query items for inclusion in a subsequent search for other members. Region 10(a) is a link that takes members to member search screen 10. Button 12 takes members to the add query item screen, which allows members to add a query item to the appropriate category. Button 14 takes members to the extend category screen, which allows members to extend the current category name. Button 16 allows members to subscribe to the discussion group that is attached to the current query item or category name.

Figure 4:
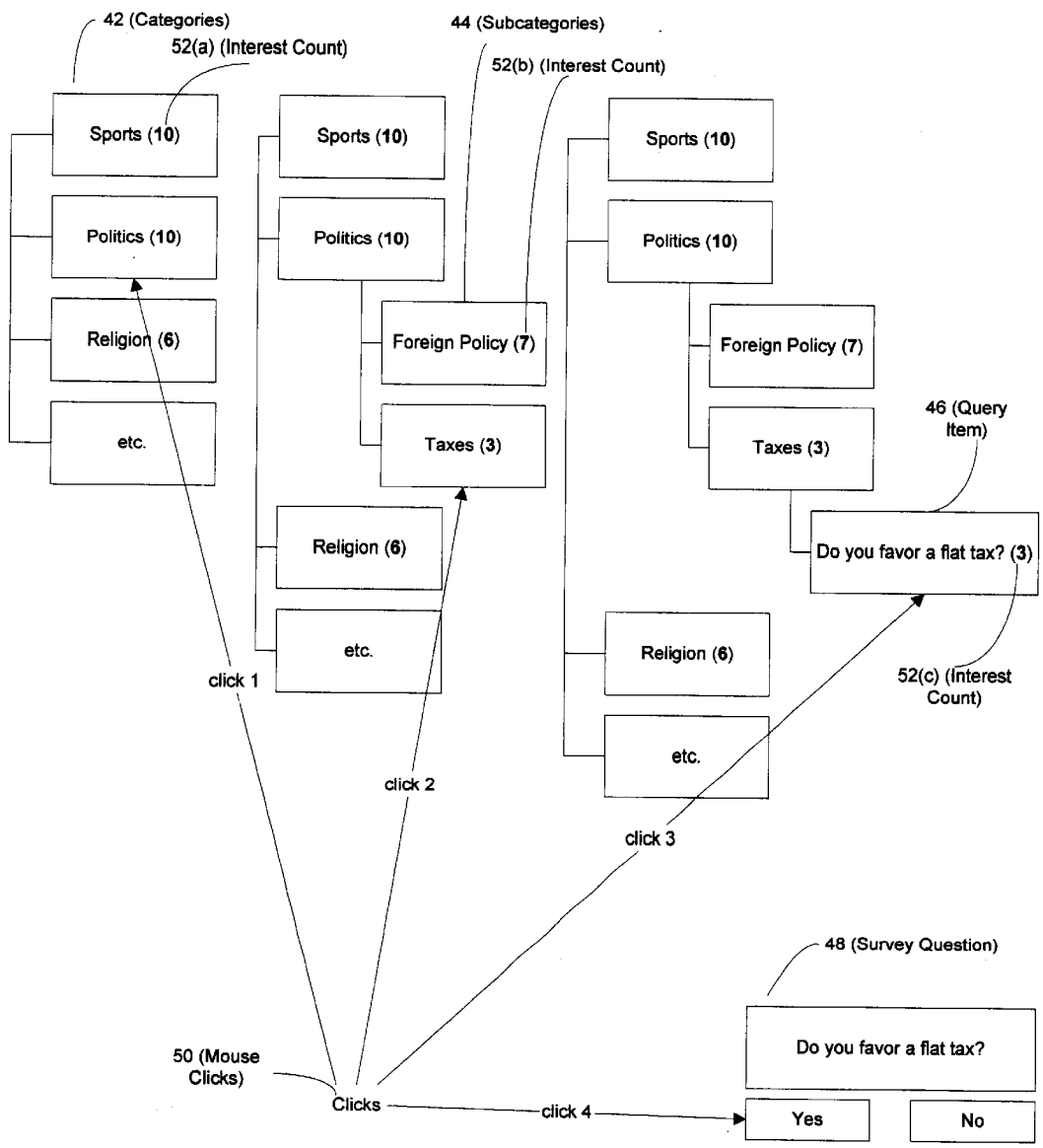
FIG. 4 is a hierarchical representation of level and sublevel category organization of the database, in accordance with a preferred embodiment of the subject invention.
Figure 5:
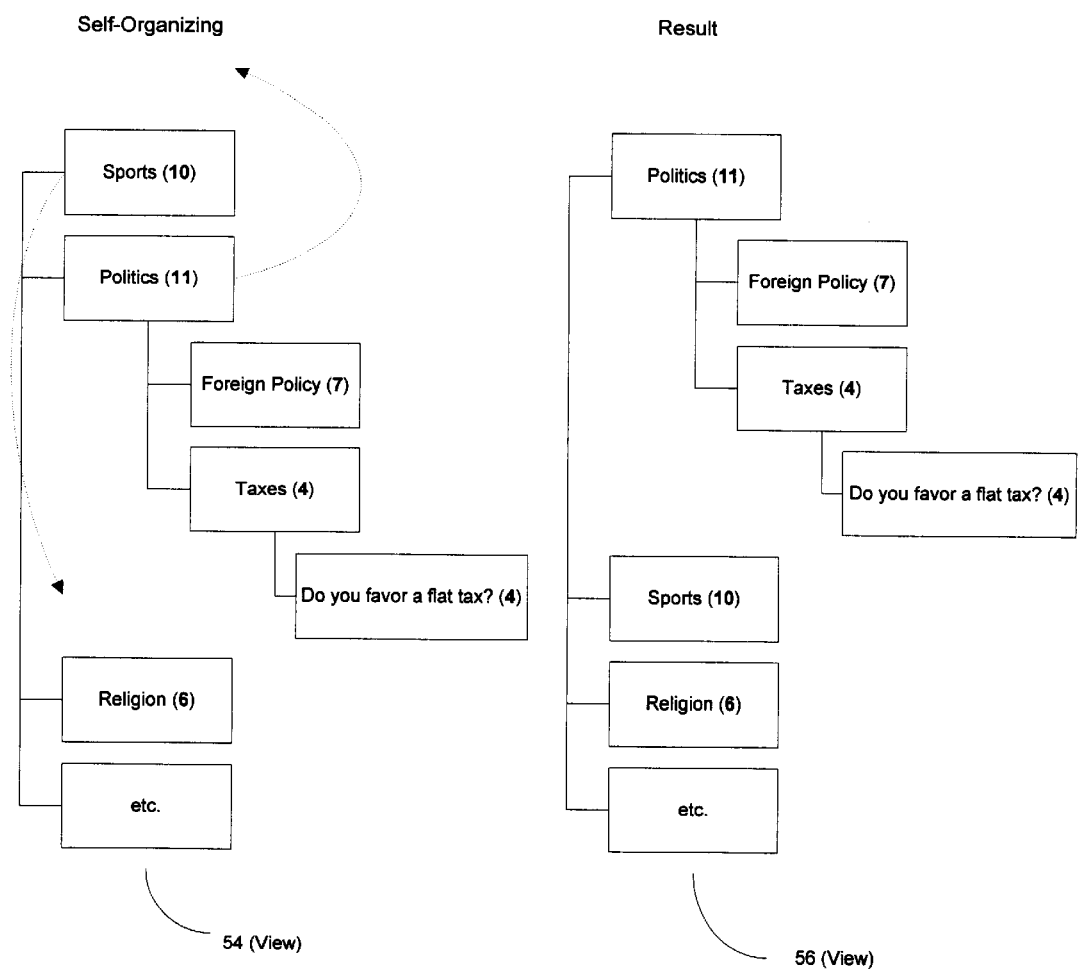
FIG. 5 is a hierarchical representation of the consequential reorganization of the level and sublevel categories of the database, as a result of the four clicking operations shown in FIG. 4.

FIG. 4 is an internal representation of the content hierarchy navigation and sorting process and database structure. In particular, categories 42 include subcategories 44 which further include query item 46. As a person clicks 50 on any one of these, the counter for each is incremented by a value of one (1) and the system resorts the hierarchy (resorting is shown in FIG. 5, in greater detail). The categories 42, subcategories 44 and query items 46 are also expanded by mouse clicks 50, with the final level of query items 46, which, when selected may cause a survey question 48 to be administered to the member.

By automatically incrementing the counters for each such category, subcategory and subsubcategory as each is selected by each member, and then resorting the database, the relative interest of each category, subcategory and subsubcategory is shown "on the fly" in virtual real time (delayed solely by processing speed and I/O time). This objective, impartial, summing approach provides relevant information to the membership.

FIG. 5 is a continuation of FIG. 4, after clicks 50, showing an internal representation of the content hierarchy navigation and sorting process. Click 50 shows self-organization at view 54, in that the increased interest count of the query item "[d]o you favor a flat tax?" (an example) is aggregated "up" the content hierarchy to ultimately cause the top-level category sports, which has an interest count of 10 to switch places with the top-level category politics, which now has an interest count of 11. The resultant hierarchy is shown in view 56.

Figure 6:
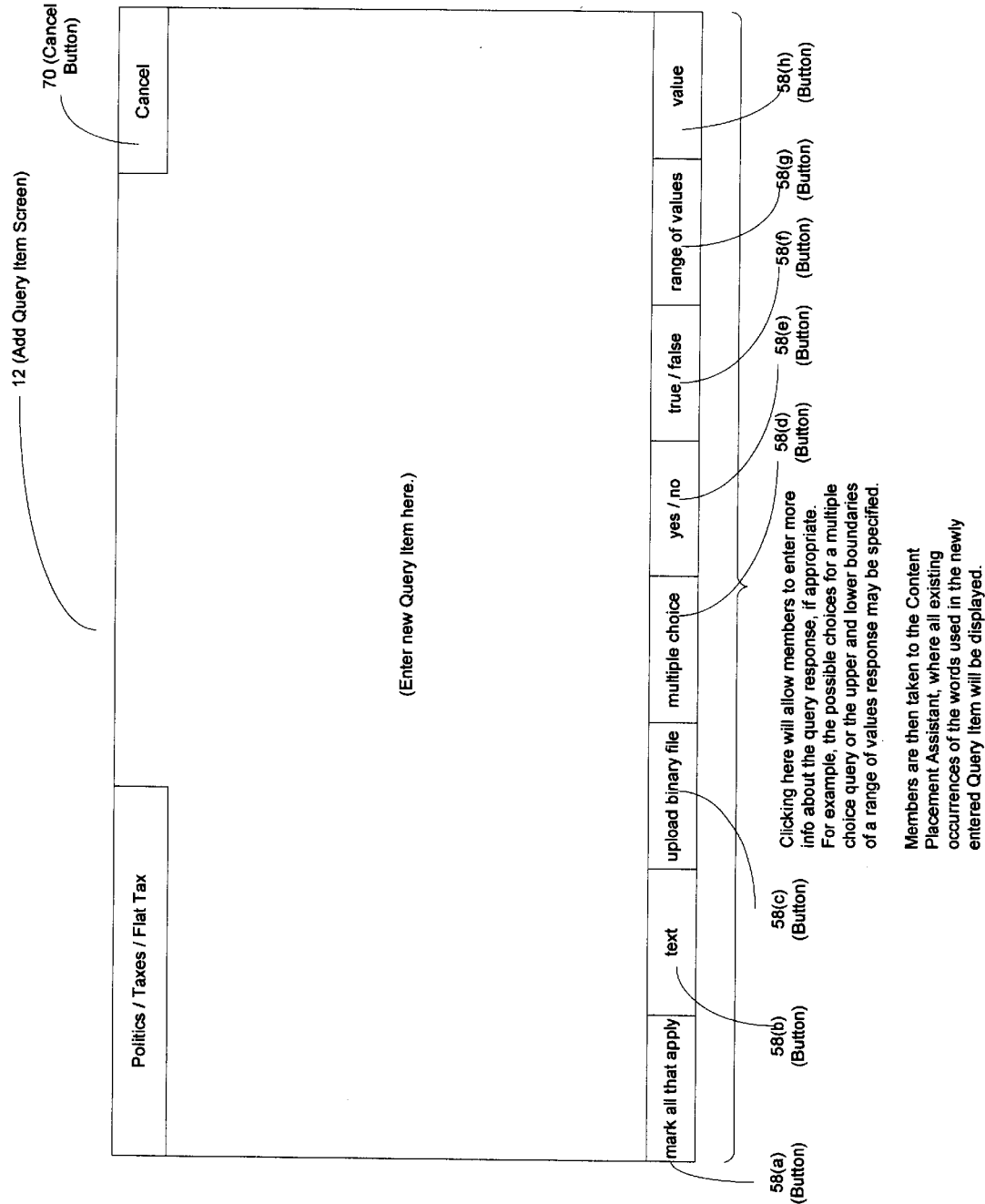
FIG. 6 is a breakout diagram of the functionality of the "add query item" component of the instant invention, shown in FIG. 1.

Beyond the resorting based upon interest, lies the ability to add query items to the database. Accordingly; FIG. 6 shows the add query item screen 12, which allows members to add a new query item to an existing category path. After the new query item is entered, members must select the type of query to be administered when other members select the added query item in the navigation screen 6. Clicking on buttons 58(a) through 58(h) determines the response type and may prompt members for additional information—such as multiple choice options, or the lower and upper boundaries for a "Range of Values" response, for example. Response type "Mark All That Apply," represented by button 58(*a*) allows members to select one or more of a number of multiple choice responses. Response type "Text," represented by button 58(*b*) allows members to enter a free-form text response. Response type "Upload Binary File," represented by button 58(*c*) allows members to specify a binary file—such as photo, data file, or program— to be uploaded to the site as their response. Response type "Multiple Choice," represented by button 58(*d*) allows members to select one of two or more multiple choice responses. Response type "Yes/No," represented by button 58(*e*) allows members tok answer "yes" or "no". Response type "True/False," represented by button 58(*f*) allows members to answer "true" or "false". Response type "Range of Values," represented by button 58(*g*) allows members to enter a value between a lower and upper boundary. Response type "Value," represented by button 58(*h*) allows members to enter a value.

Figure 7:
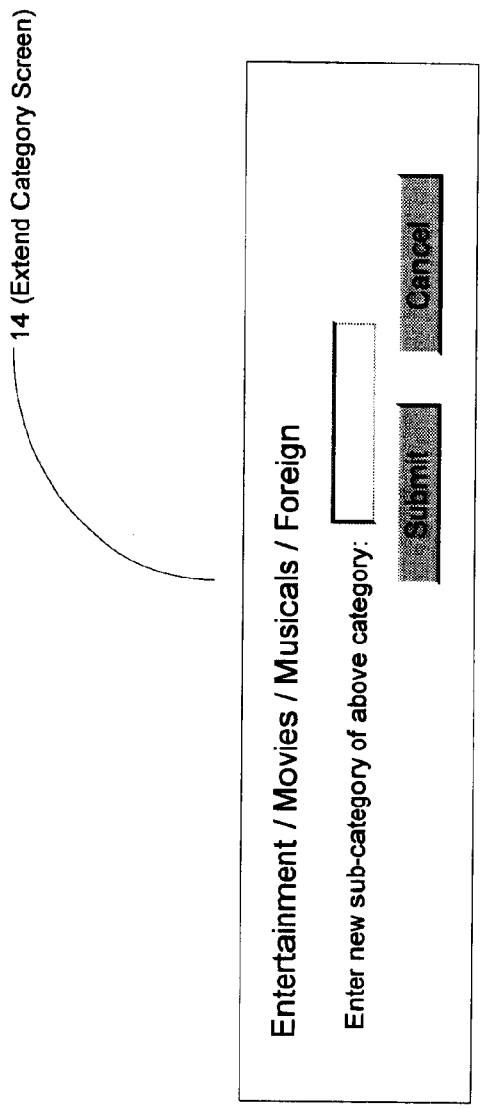
FIG. 7 is a breakout diagram of the functionality of the "extend category" component of the instant invention, shown in FIG. 1.

In addition to the resorting function based upon interest as demonstrated by a member's arrival at a location, and beyond the "add query item" shown in FIG. 6, lies the additional ability to "extend" a category as shown in FIG. 7. Extend category screen 14 allows members to enter a category name that extends the current category path. In other words, the member can add an additional category, subcategory or subsubcategory to the existing path, thereby extending, and providing an opportunity for others to demonstrate an interest by arriving at such, extended locations.

Figure 8:
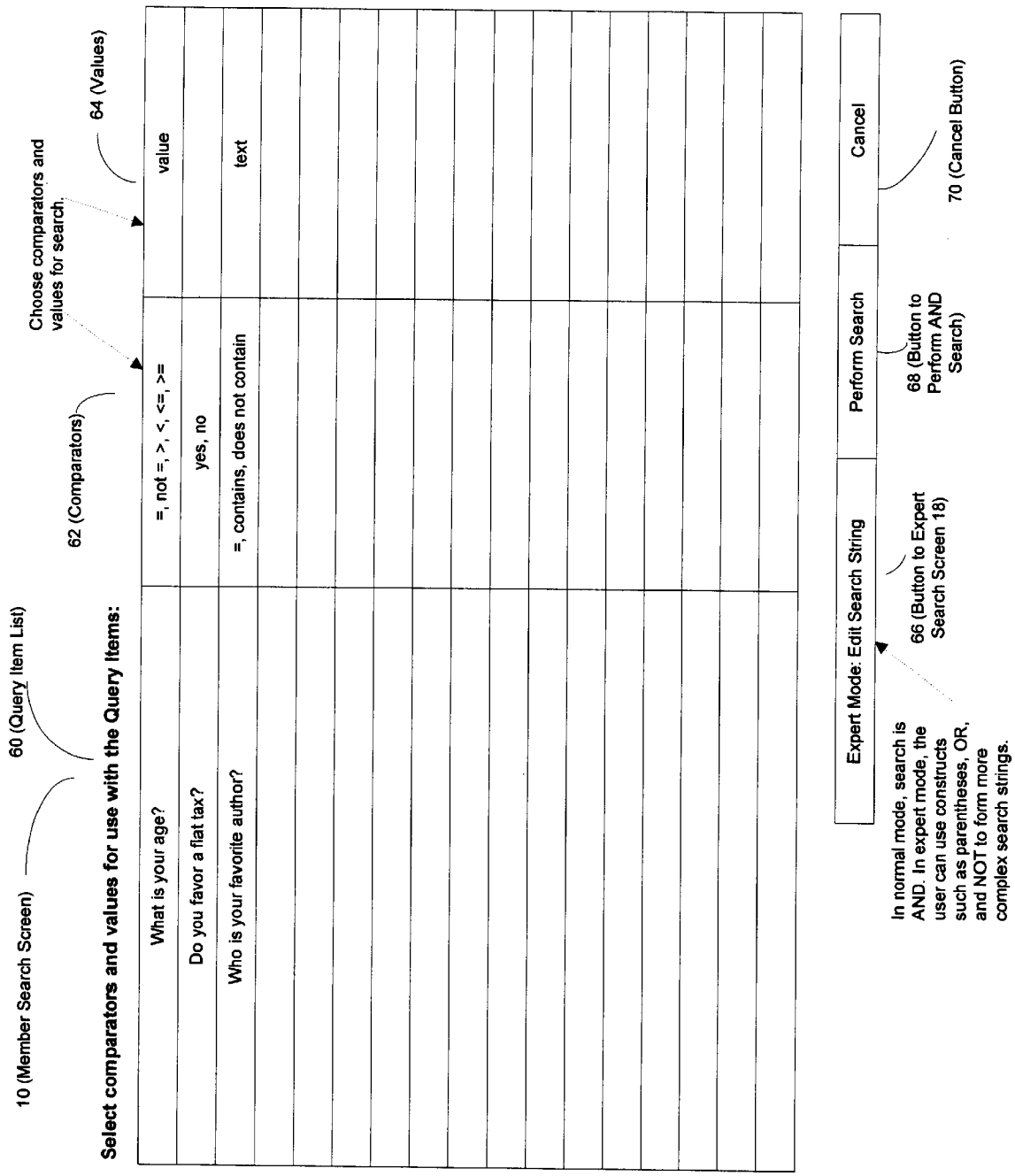
FIG. 8 is a breakout diagram of the functionality of the "member search" component of the instant invention, shown in FIG. 1.

FIG. 8 shows the detail of member search screen 10. The query items that appear in list 60 are those that were marked for inclusion by the member in the search criteria in navigation screen 6. Comparators 62 are selected and values 64 entered to define the list of members to be returned by the search. The search is of type AND—only members for which ALL query items match the search criteria are returned. Query items may also be deleted. Button 66 takes members to the expert search screen 18 (see FIG. 9), which allows more complex AND/OR/AND-NOT/OR-NOT searches to be performed. Button 68 performs the AND search as is; and button 70 is the cancel button throughout.

Figure 9:
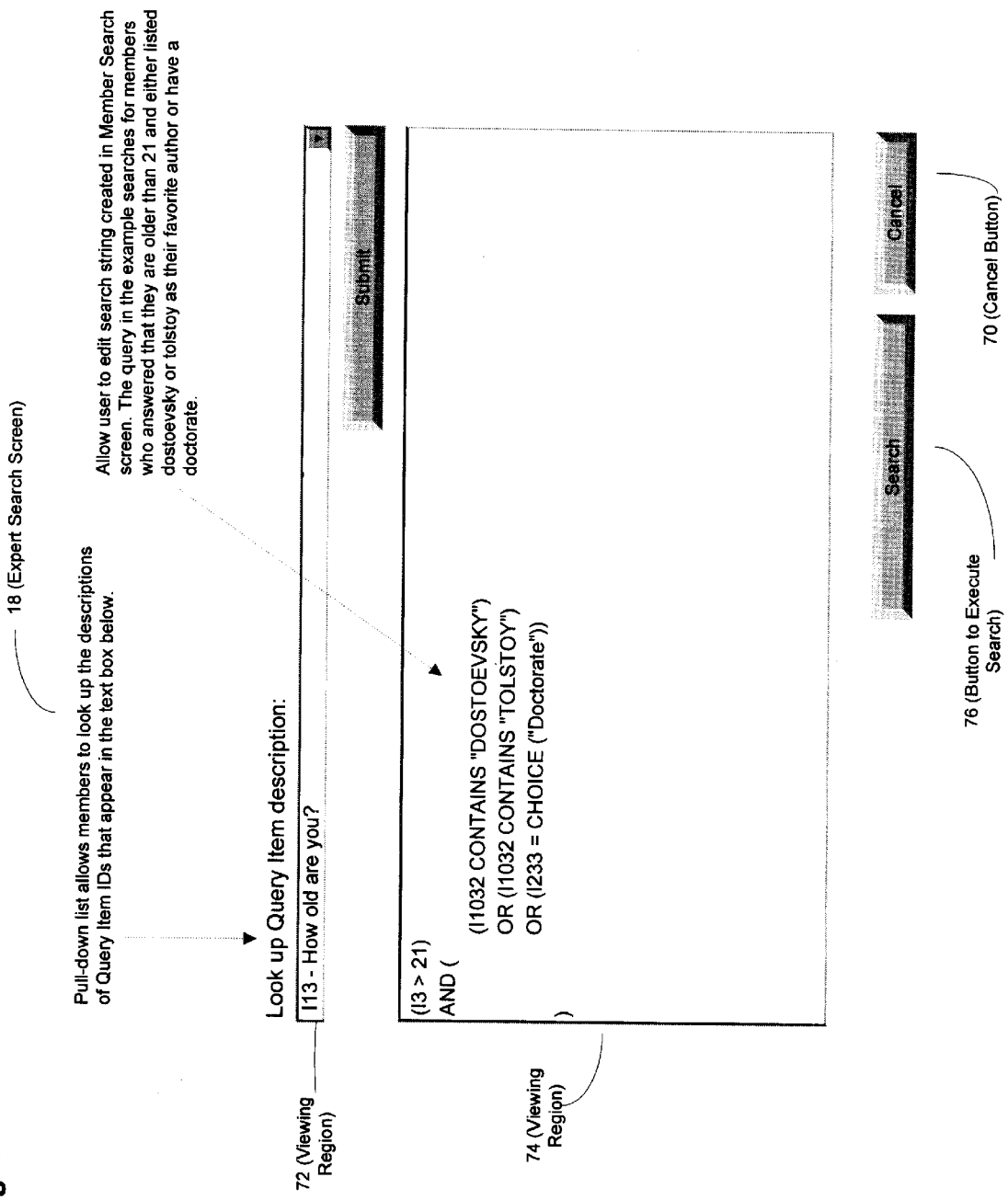
FIG. 9 is a breakout diagram of the functionality of the "expert search" component of the instant invention, shown in FIG. 1.

FIG. 9 shows expert search screen 18. Definitionally, this expert search screen 18 provides greater boolean search tools, beyond those set forth in the member search screen 10. Members are allowed to add parentheses, and OR, AND-NOT, and OR-NOT constructs to the simple AND query constructed in the viewing search region 74, via the member search screen 10. Viewing region 72 provides members with the ability to look up the original description of all of the query items to which the current search makes reference. Button 76 executes the search.

Figure 12:
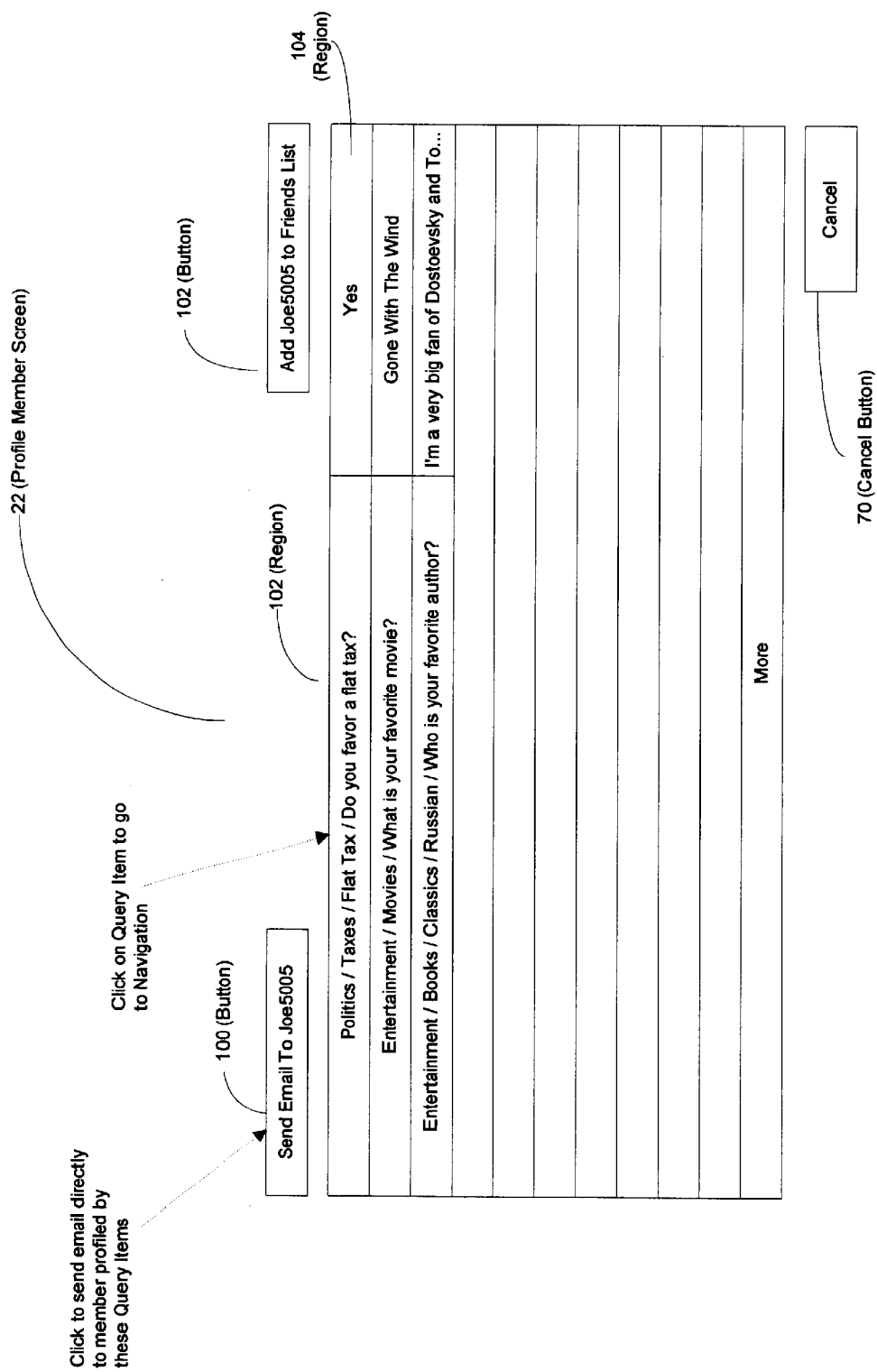
FIG. 12 is a breakout diagram of the functionality of the "member profiling" sub-component of the "member search" component of the instant invention, shown in FIG. 1.

The results of the searches, either the member search 10 as shown in FIG. 8 or the expert search 18 as shown in FIG. 9, i.e., the profiles of the users that meet the search criteria, are shown in FIG. 12.

Figure 10:
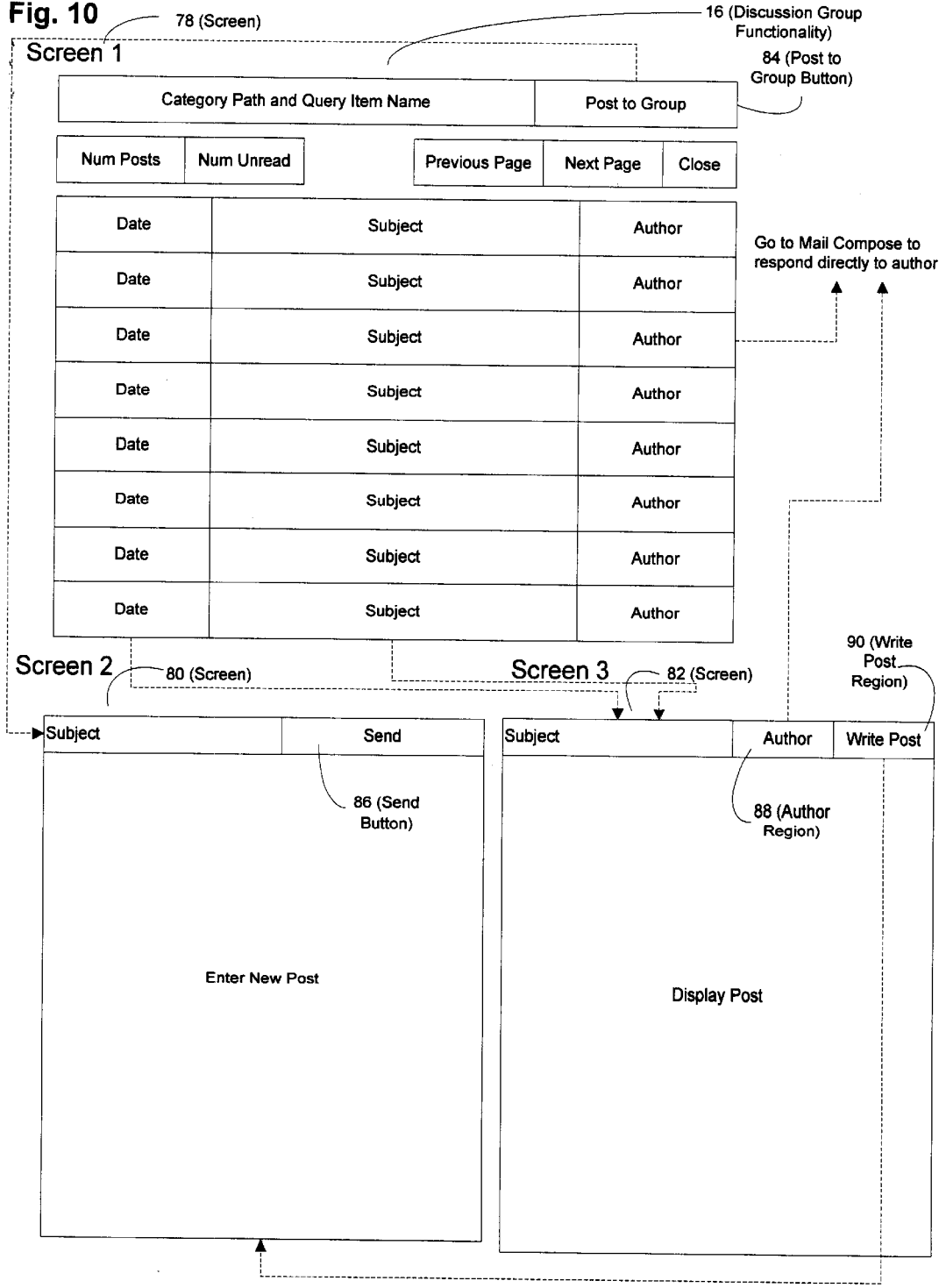
FIG. 10 is a breakout diagram of the functionality of the "discussion group manager" component of the instant invention, shown in FIG. 1.

FIG. 10 shows discussion group functionality 16, in which members may read, discussion group postings, submit postings to said discussion group, and go to their email outbox to compose email to authors of postings to said discussion group. All discussion groups are linked to category names or query items. Screen 78 shows the functionality of a screen 1 of the discussion group. The category path name of the category or query item associated with the current discussion group is displayed. Members may post to the discussion group by engaging button 84, then reaching screen 80 (screen 2), then engaging send button 86. Via screen 82 (screen 3) members can read the postings of other discussion group members see the author of the posting at region 88, and respond at region 90. Members may also go directly to their mail out-box to send email directly to the 88 authors of postings to the Discussion Group.

FIG. 11 shows content placement assistant screen 28, in which members are assisted in placing entries at step 96 of their newly constructed query item or category name. Region 92 shows members where in the existing content hierarchy keywords that appear in their newly constructed query item or category name may be found. Region 94 shows the keywords corresponding to the specific items in region 92. Control button 98 allows members to ignore the information presented to them and continue with the placement of the newly constructed content. As stated before button 70 is the cancel operation.

The results of the search of profiles is shown in FIG. 12, in which the profile member screen 22 is shown. In this manner, individual members are dynamically profiled by their responses to query items. Button 100 allows members to go to the mail out-box screen to communicate directly with the profiled member. Region 102 shows the questions to which the profiled member has chosen to respond and Region 104 shows the corresponding responses. Button 106 allows the addition of the profiled individual to the "friends list."

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

We claim:

1. A system for receiving, organizing and displaying information received from a plurality of users, comprising:
    (a) a hierarchical database having at least one expandable level, at least one of said at least one expandable levels having at least two expandable sublevels;
    (b) an interactive interface for:
        (1) placing each user at a level and sublevel in the database;
        (2) receiving user-supplied information for modification and addition to the content and structure of the levels and sublevels of said database;
        (3) receiving user-supplied commands for navigating through and extracting content from said database;
        (4) presenting content from the database in accordance with the information and commands supplied;
    (c) a counting routine which increments a level and sublevel specific counter each time a user is placed at a level and sublevel within said at least two expandable levels and sublevels; and
    (d) a database sorting function for gathering the plurality of user-supplied information and commands virtually simultaneously, and updating the hierarchical structure of the database in accordance with the magnitude of the number of the specific counter.

2. The system of claim 1, wherein the database levels and sublevels are selected from the group consisting of categories and query items.

3. The system of claim 2, wherein said commands are selected from the group consisting of search, add, select and interact.

4. The system of claim 1, further comprising a data base search engine for receiving database search commands from at least one user, searching the database for matches, and presenting the results of the search.

5. A system for dynamically profiling members of an on-line community, comprising:

(a) a database of member-supplied categories, subcategories, query items and responses to query items, each response to each query item comprising the member(s) who have responded to that query item and the specific per member response to that query item;

(b) a search engine for receiving at least one member-provided search request and search criteria, and for matching user(s) from said database of responses to query items whose responses match the member-provided search criteria; and (c) presentation means for displaying the identity of the matched members.

6. The system of claim 5, further comprising a contact mechanism by which the searching member can interact with at least one of said matched members.

7. The system of claim 6, wherein said contact mechanism comprises an email communication between said searching member and said at least one matched members.

* * * * *